Nov. 3, 1953    H. D. NORTH, JR    2,657,951
SPRAYING DEVICE
Filed Oct. 18, 1949

INVENTOR.
Harold D. North, Jr.
BY
Justin W. Macklin
ATTY

Patented Nov. 3, 1953

2,657,951

UNITED STATES PATENT OFFICE 2,657,951

SPRAYING DEVICE

Harold D. North, Jr., Shaker Heights, Ohio

Application October 18, 1949, Serial No. 122,041

6 Claims. (Cl. 299—101)

This invention relates to a spraying device and has for its essential objects the utilization of a standard type of liquid container to which my spraying device is adapted to be attached, and which shall afford a substantially uniform even spray, both when the container is full and when only a small amount of liquid remains in the container.

In my device the spray is effected by gravity pull, and an object is to provide means for securing a gravity pressure head, or spraying force, even when the liquid in the container reaches a low level, and by which means also the spray may be conveniently directed.

My device is preferably in the form of a unitary structure which may be made of an inert material, and which may be self-supporting and is adapted to be placed upon and removed from the usual screw threads of liquid containers, such as jugs, or the like, after the manner of and with the ease of removing and replacing a screw cap.

It preferably includes a venting tube leading up into the liquid or above the liquid level to permit the entrance of air and to permit free flow by preventing the formation of a vacuum above the liquid.

A special use for such a spraying device is that of applying selective herbicides, such as dichloro-phenoxy-acetic acid (2,4-D), its salts, or its esters, and other weed killers, plant foods, and the like, which it may be desired to apply to individual plants or to selected large areas such as lawns.

Further objects include the provision of a fine fan-shaped spray, and in the use of which a carefully controlled quantity of the liquid may be sprayed upon a given area. The minimum speed of flow should be such that the desired fan-shape and sufficient force is maintained for effective use. To this end the extension provides a liquid pressure head or column of about one foot, more or less, when the container is inverted and the spray nozzle is in active position.

Other objects include the provision of a device which may be manufactured by injection molding operation, thus producing uniform parts adapted to be fitted to standard containers and reducing the cost of manufacture while facilitating the convenience of assembly with a spraying disk or dome of simple special construction, as will appear.

Another specific object includes so constructing the nozzle tube and container attaching portion that a receptacle is formed at the attaching end of the tube which may have a known capacity and which may facilitate measuring the amount of weed killer, plant food or the like, to be used for mixing with a container full of water. For example, a convenient arrangement is to so construct this measuring receptacle attachment portion that filling it once or twice with the spray material would provide the proper amount for a given container.

Other specific objects will become apparent in the following description which relates to the accompanying drawings, and in which.

There has been an increasingly extensive use of modern herbicides, plant foods, and the like, which are mixed with water and sprayed on the plants or lawns. However, inconvenience has been encountered in the use of such materials.

My invention provides means whereby the householder or gardener may utilize a conveniently available container in which the material may be prepared by mixing the liquid and from which it may be applied by spraying with my device attached to the same container.

Figure 1:
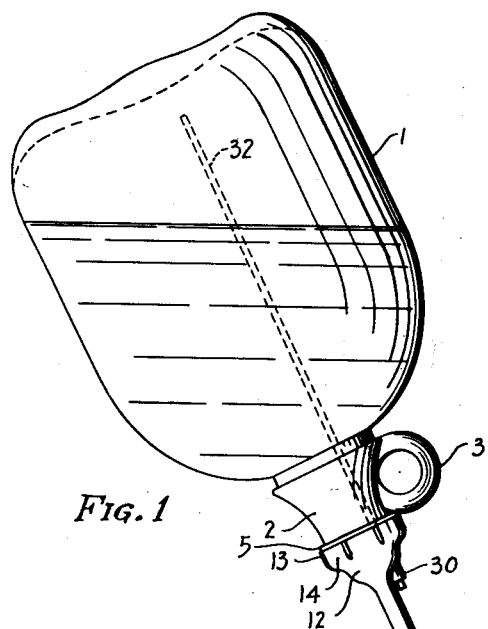
Fig. 1 is a side elevation of a suitable container showing my spraying attachment fitted thereto and in operative position.
Figure 2:
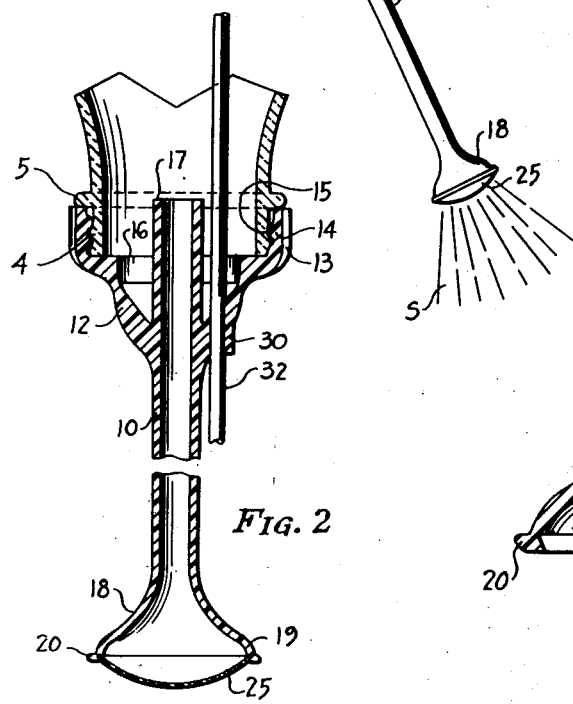
Fig. 2 is an axial section through the spraying device showing it attached to the threaded neck of the container.
Figure 4:
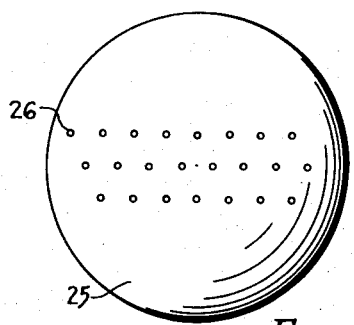
Fig. 4 is an enlarged elevation of the dome-shaped spraying disk or head.
Figure 5:
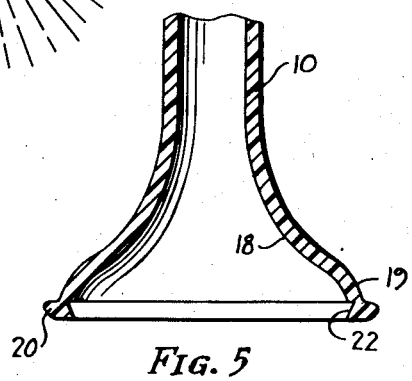
Fig. 5 is an axial section showing the end of the molded part before placing the spray disk therein.

Referring to the drawings by the use of reference characters, the container 1, appearing in Fig. 1, is illustrative of any suitable container and is there shown as an ordinary one-gallon jug having a neck portion 2, handle 3, and the usual threads indicated at 4 (Fig. 2).

My spraying attachment is adapted to fitting these threads, and it is desired that it have corresponding threads and a sealing shoulder, and that it may be so constructed as to be injection molded.

As shown, the molded attachment and spray tube and head-carrying portions comprise a unitary piece in which 10 is a tubular portion having a bell-shaped skirt 12 provided with an internally threaded flange 14 having threads 15 coacting with the threads 4. Below this threaded skirt is an inwardly projecting shoulder 16 adapted to tightly embrace the end of the bottle. Ordinarily the flange 15 may likewise contact a bead 5 on the bottle. Ribs 13 on the outer face of the flange 14 may facilitate finger gripping for tightening or loosening the device on the threads, as well as serving to strengthen this flange.

As stated the tube and unitary bell portions 12 and 18 and of course the threads and shoulders 16 are so formed that they may be injection molded, and the unitary article thus formed is preferably made of an inert thermo-plastic material such as polyethylene. A characteristic of such a material is its ability to hold its shape while being somewhat resilient. This resiliency lends itself to assured good fit of the threads and sealing of the shoulders 16 against the end of the container neck without requiring the use of a gasket.

Figure 3:
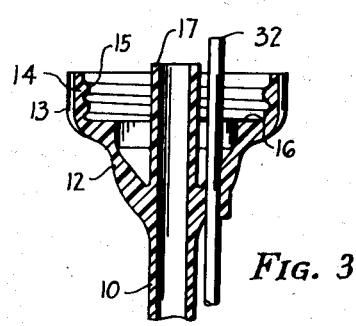
Fig. 3 is a fragmentary section showing the measuring cup end of the spraying device.

The tube 10 has its upper or inner end 17 projecting somewhat above the plane of the upper edge of the flange 14 (as shown in Figs. 2 and 3), whereby the bell-shaped portion forms a cup or receptacle which may be of a predetermined capacity, as stated, for measuring purposes.

The lower or spraying end of the tube 10 is flared outwardly as at 18, and then inwardly somewhat at 19 to a rim portion 20. In the rim portion is formed an undercut or rabbit groove 22 for receiving the edge or perimeter of the crown-shaped or convex disk 25. The disk 25 is preferably of metal and is provided with spray openings 26 shown as arranged in three transverse rows, whereby a fan-like spray S is formed when the parts are in the operating position, shown in Fig 2.

A boss 30 formed on the bell has an opening therethrough for receiving a vent tube 32 which is preferably made of plastic material and is slidable in the opening in the boss while fitting tightly enough to form a liquid seal.

From the foregoing description it will be seen that the device is capable of being very conveniently used. With my spraying attachment removed and held with its container end upright, as shown in Fig. 3, the conical cup formed by the end may be filled with the material to be mixed with the water for spraying and obviously may be filled one, two or more times for measured amounts.

The liquid, usually water, may be mixed with the spray material and thoroughly stirred by placing the spraying device onto the container. Thorough shaking may be effected without spilling the contents. The filled container may then be inverted and the head of the liquid will effect the spray, as illustrated in Fig. 1. The narrow fan-like spray may be applied with a sweeping motion over the entire area of the lawn or by inverting the container and then tipping it downwardly over selected spots. The spray may be confined to any exact small area desired. The latter feature is very useful for weed killing and similar uses.

Having thus described my invention, what I claim is:

1. A spraying attachment for a standard jug having a threaded opening comprising a thermoplastic unit forming a tube and cap portion integral with the tube and flaring outwardly therefrom toward the cap fitting portion, the latter being provided with internal threads and a sealing shoulder, and the tube extending into the cap portion and beyond the plane of the rim thereof, the other end of the tube being shaped to receive a disk-like spraying head, said flaring portion having an opening therethrough parallel with the tube and inside of the cap portion, and said device including a vent tube slidably fitted in the latter opening for extending upwardly into the container and adapted to be longitudinally adjustable therein, said unit being formed by thermoplastic molding of a self-supporting but somewhat resilient material.

2. The described in claim 1 in which the outer end of the tube is provided with an annular groove for receiving the perimeter of the spraying disk and which is held by resiliency of the material.

3. A spraying device comprising a pouring and spraying tube having a spray head at one end, and means for attaching the tube in a self-supporting position projecting outwardly from the threaded neck of the standard container, said means comprising a cup-shaped member having a portion extending along and rigid with the tube and thence outwardly and toward the pouring neck, and having a substantially cylindrical portion provided with internal threads and also having an inwardly projecting sealing shoulder, said tube extending upwardly through the middle of the cylindrical portion and beyond the rim of the threaded portion whereby the end of the tube stands above this rim when held in an inverted position, and thus permitting the cup-shaped member to be filled and used as a measuring cup.

4. A spraying device adapted to be attached to a standard liquid container having a threaded neck forming a filling and pouring opening, said device comprising a pouring tube of a length comparable to the height of the container, an outwardly flaring cup-shaped portion integral with the tube and provided with internal threads and with a sealing shoulder and adapted to fit over and close the threaded neck of the container and adapted to support the tube in a position extending axially away from the container, a spraying head carried by the outer end of said tube and having an outwardly dished end member provided with spraying openings therethrough and said cup member having an opening therethrough substantially parallel with the tube, and a vent tube of substantially the same length as the height of the container closely fitting said opening and slidable therein, the pouring tube extending inwardly of the cup portion and of such length as to project above the rim thereof when the cup is held in an upwardly facing position whereby the cup may form a measuring cup for fluid to be mixed before spraying.

5. A spraying device for attachment to a portable container having a threaded neck forming an outlet opening and comprising a tubular member of a length comparable to the height of the container and adapted to form an extension providing a hydraulic head when the container is inverted, the device including a bell-shaped member supporting the tube and embracing the threaded neck and forming a sealing closure for the container, and a spraying head formed at the opposite end of the tube, said bell-shaped member being so positioned with relation to the tube and the length of the adjacent end of the tube being such that it projects beyond the rim of the bell-shaped member, whereby the bell-shaped member may be filled with liquid and act as a measuring receptacle.

6. The device described in claim 5, in which the bell-shaped closure and measuring receptacle member is provided with an opening therethrough registering with the outlet opening of the container, and in which a vent tube is adjustably carried in said opening.

HAROLD D. NORTH, Jr.

References Cited in the file of this patent

UNITED STATES PATENTS

| Number | Name | Date |
|---|---|---|
| 199,264 | Cody | Jan. 15, 1878 |
| 1,027,112 | Eckert | May 21, 1912 |
| 1,628,564 | Taylor | May 10, 1927 |
| 1,863,158 | Greene | June 14, 1932 |
| 2,539,559 | Ward et al. | Jan. 30, 1951 |

FOREIGN PATENTS

| Number | Country | Date |
|---|---|---|
| 616,824 | France | Nov. 6, 1926 |
| 653,276 | France | Nov. 8, 1928 |